Feb. 14, 1928.
R. T. PIERCE
1,658,902
ELECTRICAL MEASURING INSTRUMENT
Filed March 24, 1924
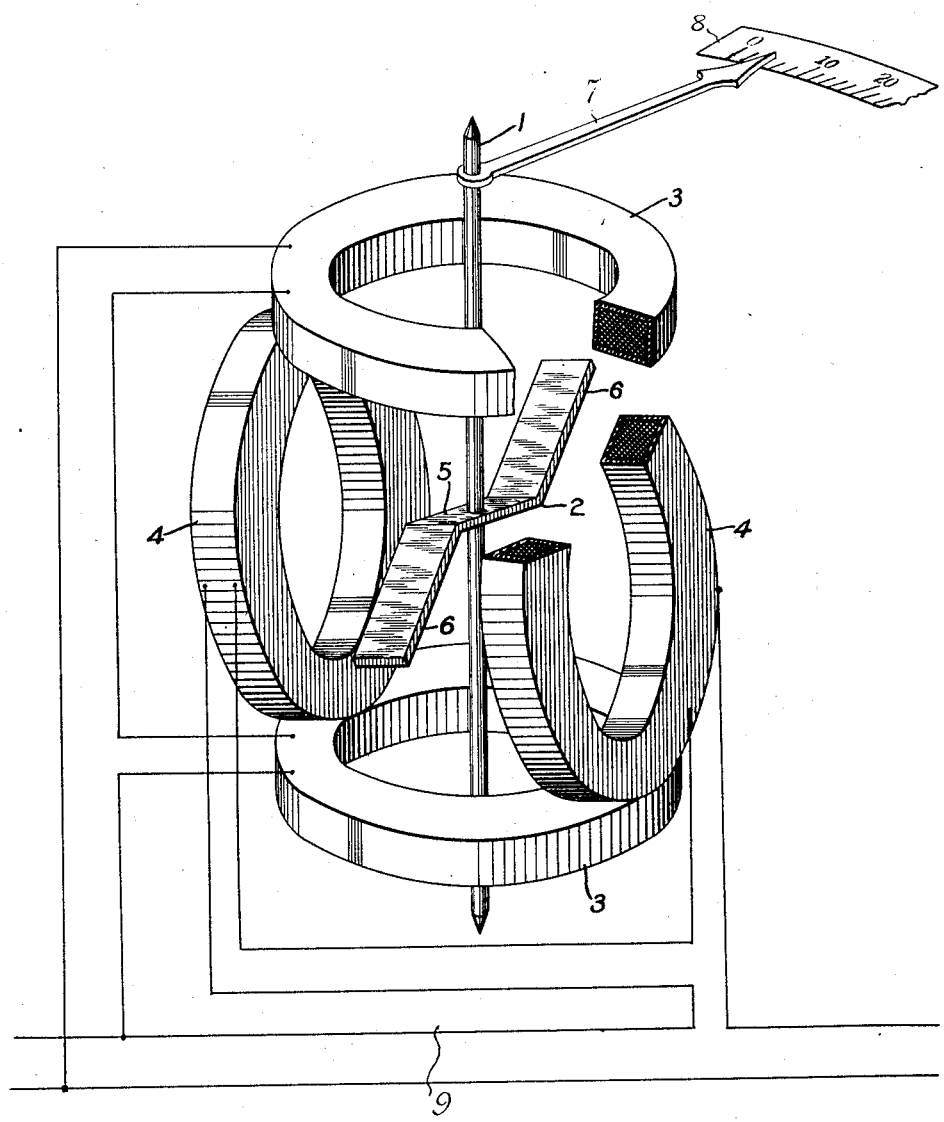
WITNESSES:
R. J. Fitzgerald
F. H. Miller
INVENTOR
Raymond T. Pierce.
BY
ATTORNEY Patented Feb. 14, 1928.

1,658,902

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed March 24, 1924. Serial No. 701,289.

My invention relates to electrical measuring instruments and particularly to instruments of the indicating or deflecting type.

One object of my invention is to provide an instrument of the above indicated character, in which a simple metal vane or element shall be actuated by magnetic flux in accordance with the product of quantities of a circuit.

Another object of my invention is to provide an indicating watt-meter or similar instrument that shall be simple and durable in construction, economical to manufacture and effective in its operation.

A further object of my invention is to provide an instrument that shall comprise parts of such construction and relation as to permit the instrument to indicate any one of several different quantities.

Heretofore, in deflecting instruments, such as watt-meters, for indicating the product of instantaneous values of different quantities of electric circuits, it has been usual to employ co-operating stationary and movable coils. Deflecting meters of the moving-vane type have been extensively employed to measure single quantities, such as volts and amperes.

A moving-vane power-factor meter has also been suggested but this instrument does not measure the product of two quantities, as in certain instruments of the moving-coil type.

In practicing my invention, I provide an instrument of the deflecting type, in which polarizing and actuating coils are so constructed and related to a simple metal element that the element may readily be actuated in accordance with the product of different quantities of a circuit, such as the components of watts, reactive watts and volt-amperes, without change in the form of the instrument. By changing the size of the conductor, number of turns and connections of the coils, instruments that are otherwise exactly like product-measuring instruments may be constructed to operate as voltmeters and ammeters.

The single figure of the accompanying drawing is a perspective view of a portion of an instrument constructed in accordance with my invention.

The operation of the instrument, as any particular one of the various instruments above mentioned, depends solely upon connections and circuits that are well known in the art, but for purposes of illustration I show how the instrument may be connected to measure the power traversing a circuit.

The instrument comprises, in general, an elongated supporting element or shaft 1, a magnetizable vane or metal element 2, a pair of polarizing coils 3 and a pair of actuating coils 4.

The element 1, which may be a flexible element, as in a galvanometer, or a shaft, as shown, supports the metal element or vane 2 at an intermediate position thereon and is adapted to support an index or pointer 7 that may be provided with a suitably calibrated scale 8.

The vane 2 is preferably constructed of thin sheet or strap iron having an intermediate portion 5 at right angles to the shaft 1 and oblique end portions 6, each of which slopes outwardly and longitudinally toward one of the polarizing coils 3.

The coils 3 are disposed in parallel-plane relation to each other surrounding the shaft 1 on opposite sides of the vane 2.

The actuating coils 4 are similarly disposed in parallel-plane relation to each other and to the longitudinal axis of the shaft 1 at right angles to the planes of the polarizing coils 3 on opposite sides of the vane 2.

Current in the coils 3 creates a magnetic-flux field in the direction of the axis of the shaft 1 to exert a polarizing influence on the ends 6 in accordance with the current in the coils 3. Current in the coils 4 creates a magnetic-flux field at right angles to the polarizing field.

Consequently, with all of the coils 3 and 4 energized, the vane 2, which is operated below saturation, will move in either direction about its axis to a position of balance between the two fields, depending upon the strengths of the currents in the coils 3 and 4.

If the coils 3 are connected in shunt to a circuit 9 and the coils 4 are connected in series with the circuit 9, the above described position of balance will be in accordance with the watts of the circuit. This position will shift with each change in the current and the voltage of the circuit Similarly, if the coils 3 are connected to be energized in accordance with the amperes in constant phase relation to the volts, while the coils 4 are connected to be energized in accordance with the volts, the vane 2 will be actuated to indicate the instantaneous values of the volt-amperes of the circuit.

Energizing both sets of the coils 3 and 4 at the same time, in accordance with volts or amperes, renders the instrument a voltmeter or an ammeter as the case may be.

Thus, an extremely sensitive instrument comprising an unbiased simple metal vane may be constructed in one form to indicate the values of any one of different quantities, or the products of different pairs of quantities of a circuit. Further, the instrument has a scale deflection of almost 180°, which is greater than the deflection of the usual indicating instruments and a very desirable feature.

While I have shown and described a particular form of my invention, changes may be effected therein without departing from the spirit and scope thereof, as set forth in the appended claims.

I claim as my invention:

1. An instrument comprising an elongated supporting element, a magnetizable member thereon, polarizing coils for said member surrounding the axis of said element at opposite sides thereof, said member having a portion projecting toward each of said coils, and a pair of actuating coils for said member having magnetic axes right-angularly related to the axis of said element.

2. An instrument comprising a magnetizable member movable about an axis, polarizing coils for said member surrounding said axis at opposite sides of said member and having magnetic axes substantially parallel to said axis, said member having a portion projecting toward each of said coils, and a pair of actuating coils for said member having magnetic axes between said polarizing coils at substantially right angles to the axis of said element.

3. An instrument comprising a movable magnetizable element, a pair of coils for polarizing the element disposed at opposite sides thereof in parallelism to the plane of movement thereof, said element having a portion midway between said coils and diametrally opposite pole-end portions projecting longitudinally in opposite directions toward said coils, and a pair of coils for actuating the element disposed at opposite sides of the element in parallel-plane relation to each other and at right angles to said polarizing coils.

4. An instrument comprising a movable magnetizable element, a pair of coils for polarizing the element disposed at opposite sides thereof in parallelism to the plane of movement thereof, said element having a transverse portion midway between said coils and diametrally opposite pole-end portions projecting diagonally in opposite directions toward said coils, and a pair of coils for actuating the element disposed at opposite sides of the element in parallel-plane relation to each other and at right angles to said polarizing coils.

5. An instrument comprising an elongated supporting element, a magnetizable member thereon, a plurality of polarizing coils for the magnetizable member surrounding the axis of the supporting element in longitudinally spaced relation to said member, said member having portions projecting toward said polarizing coils, and an actuating coil for the magnetizable member having its magnetic axis angularly related to said axis.

6. An instrument comprising a magnetizable member movable about an axis, polarizing coils for said member surrounding said axis at opposite sides of said member and having magnetic axes substantially coincident with said axis, said member having a portion projecting toward each of said coils, and a pair of actuating coils for said member having magnetic axes between said polarizing coils at substantially right angles to the axis of said element.

7. An instrument comprising an elongated supporting element, a magnetizable member thereon, polarizing coils for said member surrounding the axis of said element at opposite sides thereof, said member having a portion projecting therefrom toward each of said coils, and a pair of actuating coils for said member having magnetic axes angularly related to the axis of said element.

In testimony whereof, I have hereunto subscribed my name this 10th day of March, 1924.

RAYMOND T. PIERCE.